(12) United States Patent
Pohle et al.

(10) Patent No.: US 8,869,639 B2
(45) Date of Patent: Oct. 28, 2014

(54) MOUNTING ELEMENT FOR INSTALLING SENSORS WITHOUT PLAY

(75) Inventors: Dirk Pohle, Neuhausen (DE); Gerhard Wetzel, Korntal-Muenchingen (DE); Hans-Dieter Siems, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 427 days.

(21) Appl. No.: 13/138,271

(22) PCT Filed: Dec. 8, 2009

(86) PCT No.: PCT/EP2009/066603
§ 371 (c)(1),
(2), (4) Date: Oct. 7, 2011

(87) PCT Pub. No.: WO2010/088988
PCT Pub. Date: Aug. 12, 2010

(65) Prior Publication Data
US 2012/0017708 A1    Jan. 26, 2012

(30) Foreign Application Priority Data
Feb. 4, 2009   (DE) .......................... 10 2009 000 597

(51) Int. Cl.
| | |
|---|---|
| G01D 21/00 | (2006.01) |
| B23P 11/00 | (2006.01) |
| G01K 1/14 | (2006.01) |
| G01K 13/02 | (2006.01) |
| G01D 11/30 | (2006.01) |

(52) U.S. Cl.
CPC *G01K 1/14* (2013.01); *G01K 13/02* (2013.01); *G01D 11/30* (2013.01); *G01K 2205/02* (2013.01)
USPC ........................................................ 73/866.5

(58) Field of Classification Search
CPC ......... G01D 11/30; G01K 1/14; G01K 13/02; G01K 2205/02
USPC .............................................. 73/866.5, 23.31
See application file for complete search history.

(56) References Cited

U.S. PATENT DOCUMENTS

| | | | |
|---|---|---|---|
| 6,300,697 B1 * | 10/2001 | Findeisen et al. ........... 310/68 B |
| 7,043,993 B2 * | 5/2006 | Hayashi et al. ................. 73/708 |
| 7,382,459 B2 * | 6/2008 | Ludwig ........................ 356/437 |
| 7,426,868 B2 * | 9/2008 | Fessele et al. ................... 73/756 |
| 7,675,132 B2 * | 3/2010 | Waitl et al. .................... 257/434 |
| 2005/0155408 A1 * | 7/2005 | Weyl et al. .................... 73/23.31 |
| 2008/0295576 A1 * | 12/2008 | Yamauchi .................... 73/23.31 |
| 2009/0140284 A1 * | 6/2009 | Kurino et al. ................. 257/100 |
| 2009/0314056 A1 * | 12/2009 | McCauley et al. ........... 73/23.31 |
| 2010/0050738 A1 * | 3/2010 | Gustin ......................... 73/23.31 |

FOREIGN PATENT DOCUMENTS

| | | |
|---|---|---|
| DE | 197 11 939 | 9/1998 |
| DE | 10 2006 045 924 | 4/2008 |

(Continued)

*Primary Examiner* — Daniel S Larkin
(74) *Attorney, Agent, or Firm* — Kenyon & Kenyon LLP

(57) ABSTRACT

A mounting element for receiving a sensor has a sensor receptacle having an essentially cylindrical or funnel-shaped geometry. The sensor receptacle has openings for wetting of the sensor by a medium. The sensor is fixed in the sensor receptacle without gaps or play by a filling compound, which is in turn mounted by a mechanical undercut.

13 Claims, 2 Drawing Sheets

(56) References Cited

FOREIGN PATENT DOCUMENTS

| | | |
|---|---|---|
| EP | 2 128 572 | 12/2009 |
| JP | 7-509067 | 10/1995 |
| JP | 2004-198394 | 7/2004 |
| JP | 2004-226325 | 8/2004 |
| JP | 2005-519302 | 6/2005 |
| WO | WO 03/076920 | 9/2003 |
| WO | WO 2008/105197 | 4/2008 |

* cited by examiner

MOUNTING ELEMENT FOR INSTALLING SENSORS WITHOUT PLAY

BACKGROUND OF THE INVENTION

1. Field of the Invention

The present invention relates to a mounting element for installing sensors.

2. Description of Related Art

A device for detecting the pressure and the temperature in the intake manifold of an internal combustion engine is known from published German patent application document DE 197 11 939 A1. A temperature sensor and a pressure sensor which is fastened with low tension are situated in a shared housing. The temperature sensor and the pressure sensor which is fastened with low tension are situated on a carrier together with an analysis circuit. To introduce a pressurized medium, a connector part fastened to the housing and an adapter part, which is connected to both the carrier and the connector part, are provided. Mechanical tensions are decoupled via sealed adhesive bonds. The carrier is only glued in the housing at predefined contact points. While a device for detecting the pressure and the temperature in the intake manifold of an internal combustion engine is disclosed in published German patent application document DE 197 11 939 A1, such detection devices are also used, inter alia, for detecting the temperature of a liquid, flowing medium, such as transmission oil or another hydraulic liquid. To produce an informative temperature signal, it is typically to be ensured that the temperature sensor is exposed to the flowing medium, i.e., is either immersed as deeply as possible therein or is enclosed or wetted as completely as possible thereby. Since the flowing medium, a hydraulic liquid such as transmission oil or the like, flows around it, a force action is therefore exerted on the temperature sensor because of the flow movement. The medium may have different viscosities as a function of temperature and therefore may exert flow forces of various levels on the temperature sensor. It is to be ensured, for example, in the case of an NTC temperature sensor, that the fixing of the NTC temperature sensor does not worsen or cause a time delay of the temperature recording behavior of the NTC temperature sensor. In general, currently used temperature sensors for detecting the temperature of a flowing medium, such as hydraulic fluid, transmission oil, or the like, are fixed using adhesive. In particular, such temperature sensors are installed on housings produced by plastic injection-molding methods.

To permanently ensure the fixing of the NTC temperature sensor, an adhesive is used which is enclosed by an undercut geometry, for example, so that it is ensured that in the event of loss of adhesion of the adhesive, fixing of the temperature sensor is maintained. The disadvantages of this solution are that the dispensing process of the adhesive is very complex and does not have sufficient processing reliability. The behavior of the adhesive in the event of temperature changes as frequently occur, for example, in the case of hydraulic fluids which are used in motor vehicle transmissions, has not been sufficiently tested. Furthermore, hydraulic fluid, for example, automatic transmission fluid (ATF), represents a very aggressive liquid, so that in the most unfavorable case, the loss of the mechanical stability of the temperature sensor is a concern due to the aggressiveness of the hydraulic fluid or its harmful effects on the adhesive. Furthermore, adhesive may not be reliably prevented from being carried over into the glass area of the temperature sensor. Carrying over of the adhesive into the glass area worsens the thermal properties of the temperature sensor and is therefore absolutely to be avoided.

Published German patent application document DE 10 2006 045 924 A1 relates to a pressure measuring device for motor vehicle applications. It includes a pressure measuring cell, which is accommodated in a sensor assembly.

Temperature sensors which measure the temperature of a liquid or a gas very frequently enclose a vitrified measuring element having two terminal wires. At the end of the vitrification process, the liquid glass cools down and forms a sensor pill. The solidification procedure of the glass yields a geometrically undefined shape. Mechanical fixing of this undefined sensor pill is difficult, since either gaps remain, or excessive pressure results with the danger of damage to the sensor pill. Therefore, in the case of applications in which large mechanical forces do not act on the sensor pill, the sensor is exclusively fixed by mounting the terminal wires.

However, if a sensor is used in applications having high mechanical stress, in particular dynamic vibration and shaking stress, or if the measurement is to be performed directly in the flowing medium, such as liquid or gas, fixing of the sensor pill is necessary so that damage to the terminal wires, in particular a fracture at the exit point from the sensor pill, is prevented.

One possibility for gap-free fixing of the sensor pill is gluing the sensor pill on a mounting element. However, it is necessary in this case for the surfaces of the sensor pill and mounting element to have a correspondingly good surface quality, in order to allow the adhesion of the glue used. Furthermore, the effects of time, temperature, and the impact of the medium to be measured on the adhesion must not result in failure of the adhesive bond, as described above.

BRIEF SUMMARY OF THE INVENTION

According to the present invention, fixing and positioning without gaps or play of the sensor pill, which has a geometrically undefined shape, i.e., a glass body, is proposed so that use is also possible under high mechanical stress, for example, vibration or shaking stress. The end face of the sensor pill touches the floor of the mounting element upon installation. In order to ensure simple, unproblematic installation, the mounting element is implemented having a receptacle diameter D, which is larger than the largest cross-sectional area of the sensor pill to be received. The sensor pill may thus be inserted with play into the mounting element and damage is prevented during the installation. After the insertion of the sensor pill into the mounting element, the contact conductors are fixed on the mounting element. This is performed, for example, by hot caulking of the plastic.

Subsequently introduced into the mounting element is a filling compound which is preferably a thixotropically formulated epoxy compound, which is introduced into the mounting element in such a way that the filling compound flows into the opening of the mounting element in which the sensor pill is accommodated and allows undercut fixing using mounting cams which overlap the sensor pill. The thixotropic formulation of the filling compound prevents it from flowing down along the sensor pill and closing the opening for media contact, which is implemented in the mounting element. After the introduction of the filling compound, it is cured, which is performed, for example, by introducing heat, for example, by irradiation using an infrared lamp. The sensor pill is mechanically fixed in the vertical direction by the curing of the thixotropically formulated epoxy compound, and by fixing it using the mounting cam of the mounting element. The fixing to the bottom is provided by the contact of the sensor pill on the floor of the mounting element. Gap-free fixing of the sensor pill in the mounting element and simultaneously the protection thereof from external damage from the outside result.

The complete assembly which is preinstalled in this way may now be used in the flowing medium to be measured, liquid or gas, for example, in that the mounting element is immersed, in the area of the openings for the medium, in a hole from which the medium to be measured exits. Through the design and shaping of the mounting element, protection of the sensor pill is provided during the installation, e.g., in the hole, and the medium to be measured may simultaneously reach the sensor pill directly via the opening and an exact temperature measurement may thus be achieved without a time delay.

DETAILED DESCRIPTION OF THE INVENTION

Figure 1:
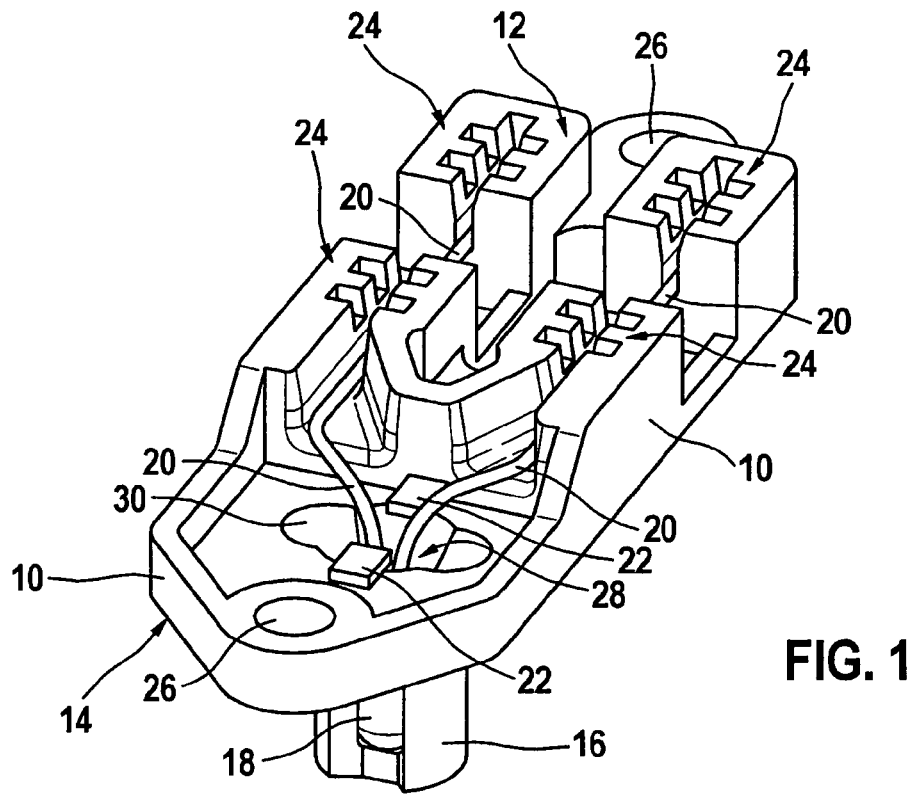
FIG. 1 shows a perspective view of a mounting element having a sensor situated in a sensor receptacle.

The illustration according to FIG. 1 shows a perspective top view of a mounting element having a sensor receptacle.

FIG. 1 shows a mounting element 10, on whose bottom side 14 a sensor receptacle 16 is implemented. A top side of mounting element 10 is identified by reference numeral 12 and includes curved conductor hold-downs 24. Contact conductors 20, which are in turn connected to sensor 18, are fastened in conductor hold-downs 24 on top side 12 of mounting element 10. Sensor 18 is a sensor pill, which is electrically contacted by contact conductors 20, which have a curved design.

Mounting cams 22, which are situated lying adjacent to one another or lying one over another or at an angular offset to one another, are located in the area of an opening, which is implemented as a funnel 30, of sensor receptacle 16. The function of mounting cams 22 on top side 12 of mounting element 10 is, after later filling of sensor receptacle 16 using a filling compound 40 (cf. description according to FIG. 2), to mechanically fix this filling compound 40 after it is cured. This is achieved in that mounting cams 22 form an undercut, in order to fix filling compound 40 shown in FIG. 2 after it flows partially into sensor receptacle 16. In addition, it may be seen from the perspective view according to FIG. 1 that two curved conductor hold-downs 24 are fastened to top side 12 of mounting element 10 on each of contact conductors 20 exiting from sensor 18. A free space remains between curved conductor hold-downs 24, in order to allow electrical contacting of contact conductors 20 of sensor 18. The plug element required for this purpose is not shown in the illustration according to FIG. 1.

Furthermore, it may be seen from the perspective view according to FIG. 1 that mounting element 10 has fastening openings 26. Using these openings, mounting element 10 may be fastened to a housing component, for example, of an automatic transmission or the like. FIG. 1 additionally shows that sensor receptacle 16, which extends downward from bottom side 14 of mounting element 10, receives sensor 18, and the wall of sensor receptacle 16 has passages. These passages are used for the purpose of allowing media contact between sensor 18 and the medium to be measured.

Figure 2:
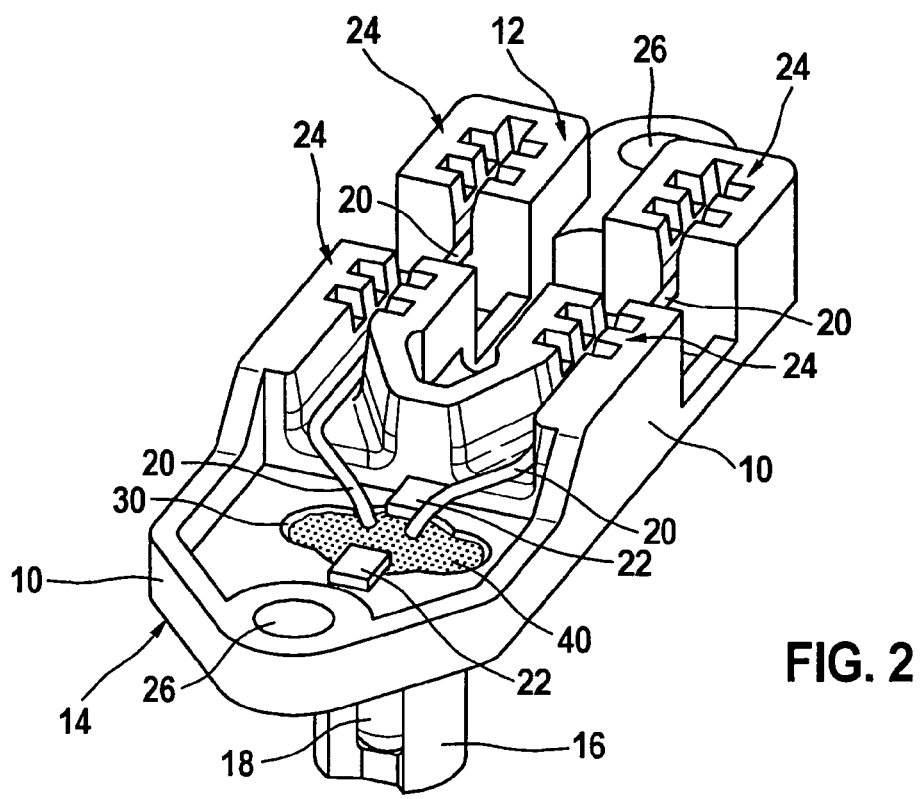
FIG. 2 shows the perspective top view of the mounting element according to FIG. 1 having filling compound introduced into the sensor receptacle.

The perspective view according to FIG. 2 shows that sensor receptacle 16 on bottom side 14 of mounting element 10 has sensor 18, and funnel-shaped opening 30 shown in FIG. 1 is filled using a filling compound 40. Filling compound 40 is preferably a thixotropically formulated epoxy compound. It is introduced into sensor receptacle 16 so that filling compound 40 flows below both mounting cams 22 provided laterally on the opening, but is prevented from flowing along sensor 18 in the direction of the floor of sensor receptacle 16 and closing the openings implemented in the wall of sensor receptacle 16 due to the thixotropic formulation of filling compound 40 (cf. description according to FIG. 3).

As shown in the perspective top view according to FIG. 2, curved contact conductors 20 extend out of filling compound 40, which is in turn overlapped by mounting cams 22 on top side 12 of mounting element 10. Mounting cams 22 form an undercut geometry with filling compound 40 after it is cured. The curing of filling compound 40 in sensor receptacle 16 and the resulting fixing of sensor 18 in sensor receptacle 16 are performed by heat, in the course of infrared irradiation, for example.

Figure 3:
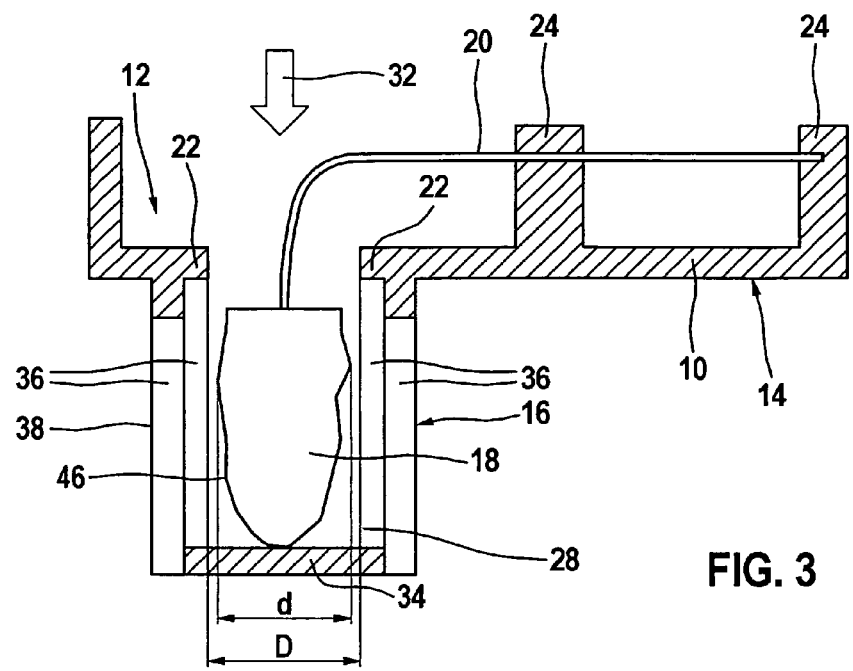
FIG. 3 shows a section of the mounting element and the sensor receptacle.

The sectional view according to FIG. 3 shows that sensor receptacle 16, which is located on bottom side 14 of mounting element 10, has openings 36 implemented in its wall, which are configured as slotted, for example. These openings 36 are used to wet sensor 18 using the medium.

FIG. 3 shows the state in which sensor 18, shaped as a sensor pill having a more or less irregular external geometry, is introduced into the interior of sensor receptacle 16 and its end face touches a floor 34 of sensor receptacle 16. An internal diameter D of sensor receptacle 16 is dimensioned in such a way that it slightly exceeds an external diameter d of sensor 18, so that damage to sensor 18, which is shaped as a glass body, for example, as it is installed in joining direction 32 in sensor receptacle 16, is reliably prevented. The wall of sensor receptacle 16 is indicated by reference numeral 38 in FIG. 3. Curved contact conductors 20 extend from the rear end face of sensor 18, angled to top side 12 of mounting element 10, up to domed conductor hold-downs 24. The diameter difference between external diameter d of sensor 18, which has an irregular geometry, and internal diameter D of sensor receptacle 16 allows simple and unproblematic installation. Sensor 18 may be inserted with play into sensor receptacle 16, damage being reliably prevented during installation. After sensor 18 is inserted into sensor receptacle 16, contact conductors 20 are fixed in domed conductor hold-downs 24. This may be performed, for example, via hot caulking of the plastic material from which mounting element 10 is preferably manufactured.

Openings 36, which are implemented in wall 38 of sensor receptacle 16, may be implemented, for example, as slots or as openings having a different geometry, so that sensor 18 is wetted after it is mechanically fixed inside sensor receptacle 16.

Figure 4:
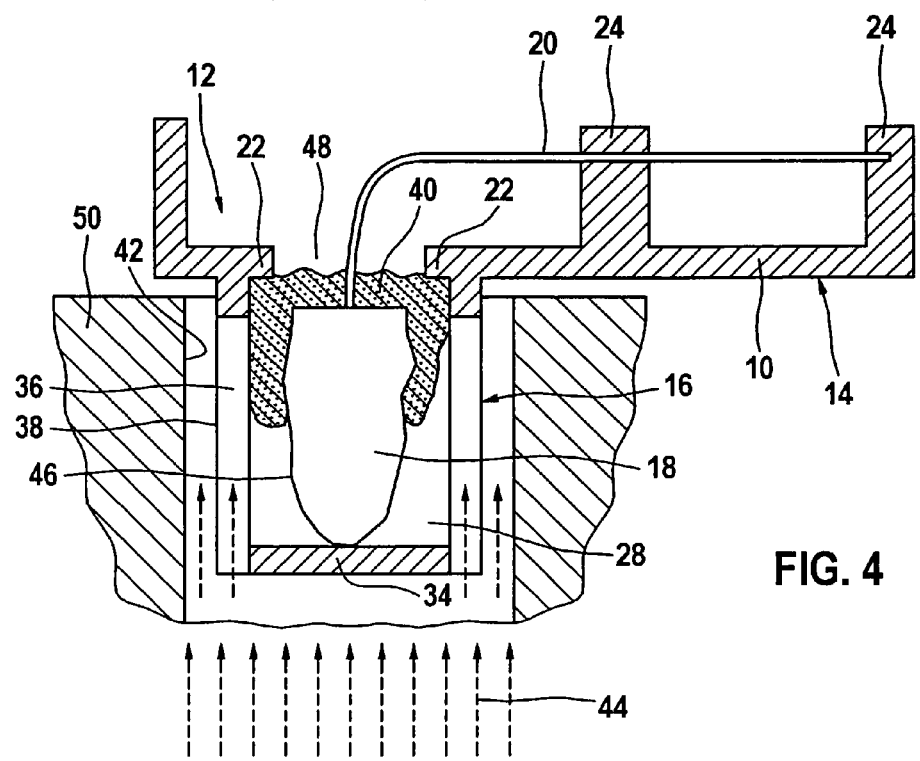
FIG. 4 shows the flow of a medium against the sensor, which is embedded in the sensor receptacle.

The illustration according to FIG. 4 shows a sectional view of mounting element 10, according to which sensor 18 is fixed in sensor receptacle 16 via a filling compound 40.

FIG. 4 shows that, as indicated in FIG. 3, sensor 18 is supported using its end face on the top side of floor 34 of sensor receptacle 16. FIG. 4 also shows that internal diameter D of sensor receptacle 16 slightly exceeds external diameter d of sensor 18, which has an undefined irregular geometry. Sensor 18 is fixed in sensor receptacle 16 by filling compound 40, which is preferably a thixotropically formulated epoxy resin or another epoxy material. Because of the thixotropy of this material, it only flows partially into sensor receptacle 16 before it cures, so that secure fixing of sensor 18 is ensured on the end face, at which contact conductors 20 exit, but it is also ensured that filling compound 40 does not wet the lateral surface of sensor 18 and in particular does not close slotted openings 36, for example, in the delimitation wall of sensor receptacle 16. The thixotropic properties of filling compound 40 thus ensure two things: on the one hand, mechanical fixing of sensor 18 in sensor receptacle 16 after the curing of filling compound 40 and, on the other hand, the ability to wet the lateral surface because openings 36 remain open in the wall of sensor receptacle 16.

The sectional view according to FIG. 4 shows that mounting cams 22, which are implemented on top side 12 of mounting element 10, form an undercut for the top side of filling compound 40. Filling compound 40 is cured by introducing heat, which may be achieved by infrared irradiation or the like, for example. The curing of filling compound 40 below mounting cam 22 fixes sensor 18. Gap-free fixing of sensor 18 in sensor receptacle 16 and simultaneously protection of sensor 18 from external damage result.

In the view according to FIG. 4, the lateral surface of sensor 18 which is exposed to a medium is indicated by reference numeral 46. Mounting element 10, which is installed in a housing 50, and on whose bottom side 14 sensor receptacle 16 having sensor 18 installed therein extends, is wetted by a medium 44 flowing against it in the flow direction, this medium wetting media-exposed surface 46 of sensor 18 because of passages or openings 36 implemented in the wall of sensor receptacle 16.

The flowing medium to be measured may be a liquid or also a gas. For example, mounting element 10 may be inserted into a hole 42 of a housing 50 or the like and—as indicated in FIG. 4—medium 44 may flow against it in the flow direction. The end face of sensor 18 opposite to contact conductors 20 is supported on floor 34 of sensor receptacle 16. Mounting element 10 may be fixed using fastening openings 26 implemented thereon on the top side of housing 50 in such a way that sensor receptacle 16 protrudes into hole 42 of housing 50 and is exposed to the medium to be measured. A defined position of sensor 18 and therefore a foundation for an exact measurement result. The contacting of contact conductors 20 on the fastening of mounting element 10 may be adapted to the particular structural surroundings, so that a modular use may be achieved for various applications.

The geometry of mounting element 10 protects sensor 18 during installation, and the medium to be measured may simultaneously reach media-exposed surface 46 of sensor 18 directly through openings 36. This allows an exact temperature measurement without a time delay. This always occurs if sensor 18 is completely enveloped, for example, and the temperature measurement occurs via the envelope using heat conduction to sensor 18. Precisely this is prevented in the case of the fixing possibility of sensor 18 in sensor receptacle 16 proposed according to the present invention, since media-exposed surface 46 of sensor 18 may remain inspection-free because of the thixotropic properties of filling compound 40.

What is claimed is:

1. A mounting element for a vitrified sensor capsule, comprising:
    a sensor receptacle configured to receive the sensor capsule, wherein the sensor receptacle has one of a cylindrical or funnel-shaped geometry, and wherein the sensor receptacle has at least one opening enabling contact between the sensor and a target medium;
    wherein the sensor capsule is fixed in the sensor receptacle by a filling compound that surrounds an upper face of the sensor capsule, and wherein the filling compound is secured by a mechanical undercut formed at a region of an upper surface of the sensor receptacle that faces away from a lower end face of the sensor capsule.

2. The mounting element as recited in claim 1, wherein the sensor receptacle has an internal diameter which is larger than a maximum external diameter of the sensor capsule.

3. The mounting element as recited in claim 1, wherein the lower end face of the sensor capsule rests on a floor of the sensor receptacle.

4. The mounting element as recited in claim 3, wherein the at least one opening of the sensor receptacle is a cutout within a sidewall that extends through the floor of the sensor receptacle thereby narrowing a width of the floor in a region of the cutout.

5. The mounting element as recited in claim 1, wherein the filling compound is an epoxy compound having thixotropic properties.

6. The mounting element as recited in claim 5, wherein the thixotropy of the filling compound prevents the filling compound from flowing down to the floor of the sensor receptacle.

7. The mounting element as recited in claim 1, further comprising:
    at least one conductor hold-down element, wherein a contact conductor extending from the sensor capsule is fastened in the conductor hold-down element.

8. The mounting element as recited in claim 1, further comprising:
    a conductor housing component, wherein:
        the sensor receptacle extends downwards from the conductor housing component; and
        two contact conductors extend from the sensor capsule within the sensor receptacle upwards through an opening in the upper surface of the conductor housing component, and then laterally away from the opening in the upper surface of the conductor housing component along two separate paths defined by conductor hold-down elements that are at the upper surface of the conductor housing component, such that the two contact conductors branch away from each other as they enter the paths from the opening in the upper surface of the conductor housing component.

9. The mounting element as recited in claim 8, wherein each of the paths includes a respective pair of conductor hold-down elements, a first conductor hold-down element of the respective pair holding down a first region of a respective one of the contact conductors, and a second conductor hold-down element of the respective pair holding down a second region of the respective one of the contact conductors.

10. The mounting element as recited in claim 8, wherein a first sidewall of one of the paths and a second sidewall of the other of the paths in combination form a 'v' shape, the first sidewall being adjacent the second sidewall.

11. A method for installing a vitrified sensor capsule in a mounting element, comprising:
    a) inserting the sensor capsule into a sensor receptacle of the mounting element, wherein the sensor receptacle has an internal diameter larger than the maximum external diameter of the sensor;
    b) introducing a filling compound into the sensor receptacle such that the filling compound surrounds an upper face of the sensor capsule;
    c) curing the filling compound in the sensor receptacle; and
    d) mechanically fixing the filling compound by mounting cams formed at a region of an upper surface of the sensor receptacle that faces away from a lower end face of the sensor capsule.

12. The method as recited in claim 11, wherein the curing of the filling compound is performed by infrared irradiation.

13. The method as recited in claim 11, further comprising: fixing at least one contact conductor that extends from the sensor capsule to a conductor hold-down element of the mounting element by hot caulking of a plastic material of the mounting element.

\* \* \* \* \*